March 31, 1936.  E. J. SVENSON  2,036,162
MACHINE TOOL UNIT
Original Filed Sept. 13, 1930  5 Sheets-Sheet 1
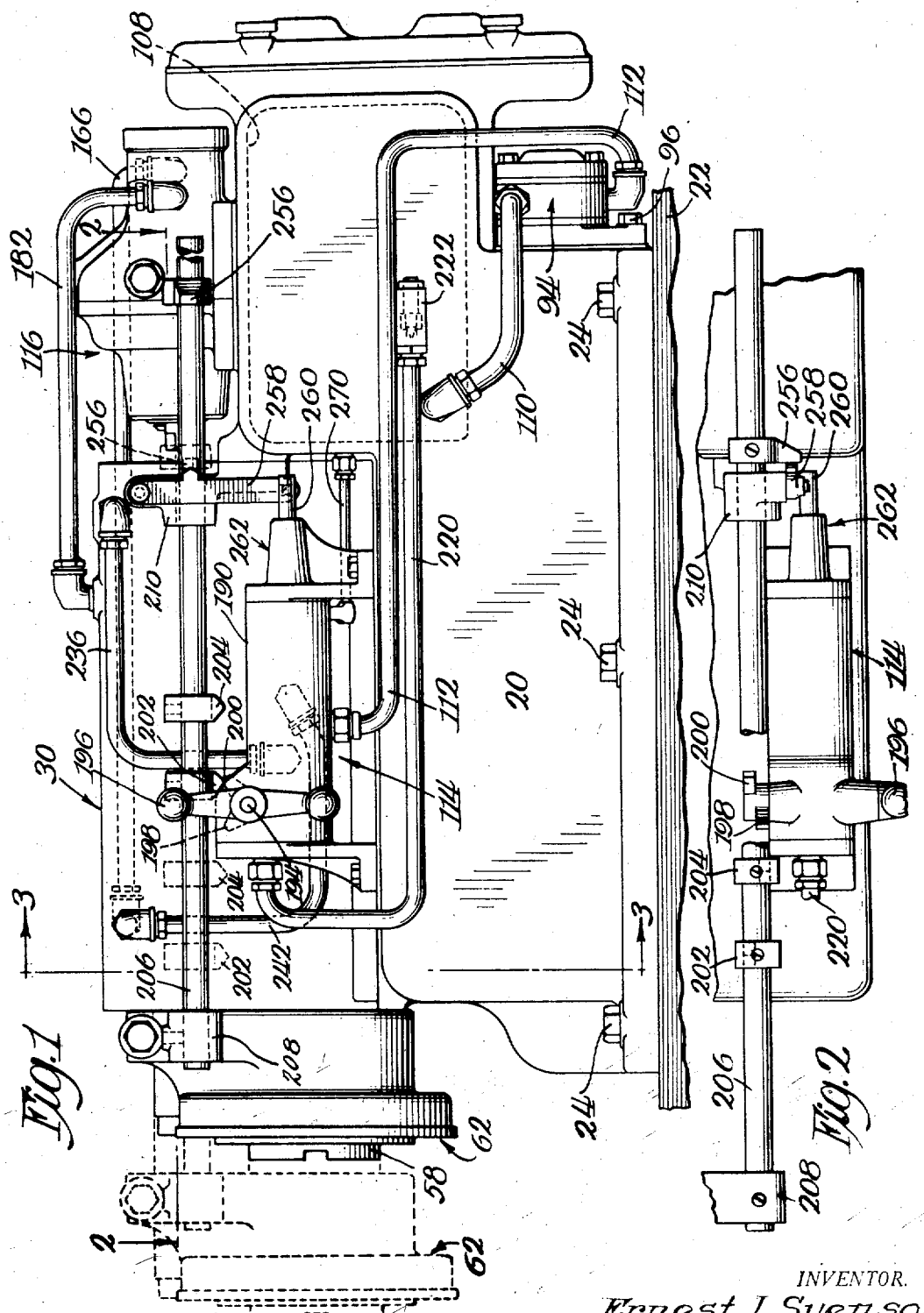
INVENTOR.
Ernest J. Svenson
BY
ATTORNEYS.

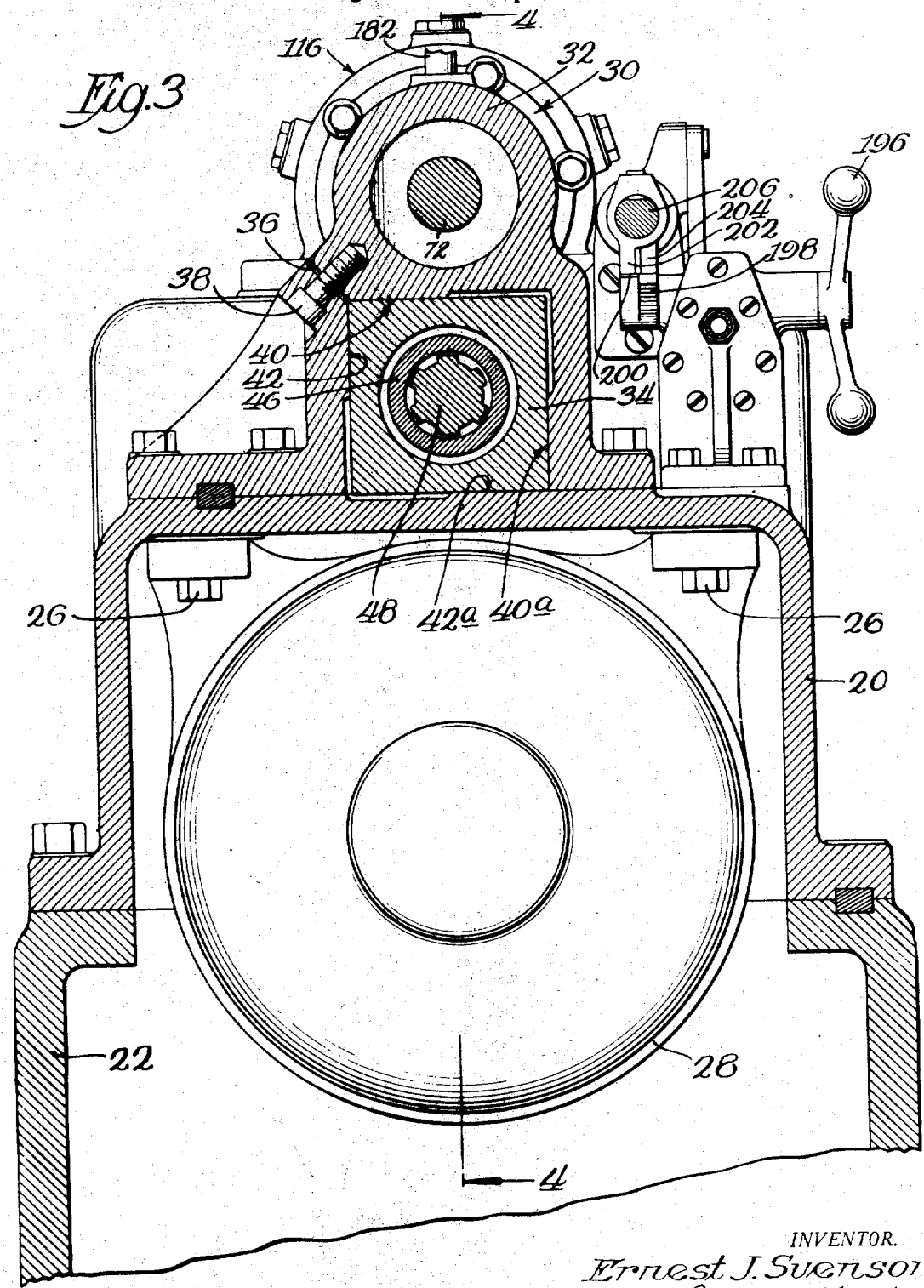

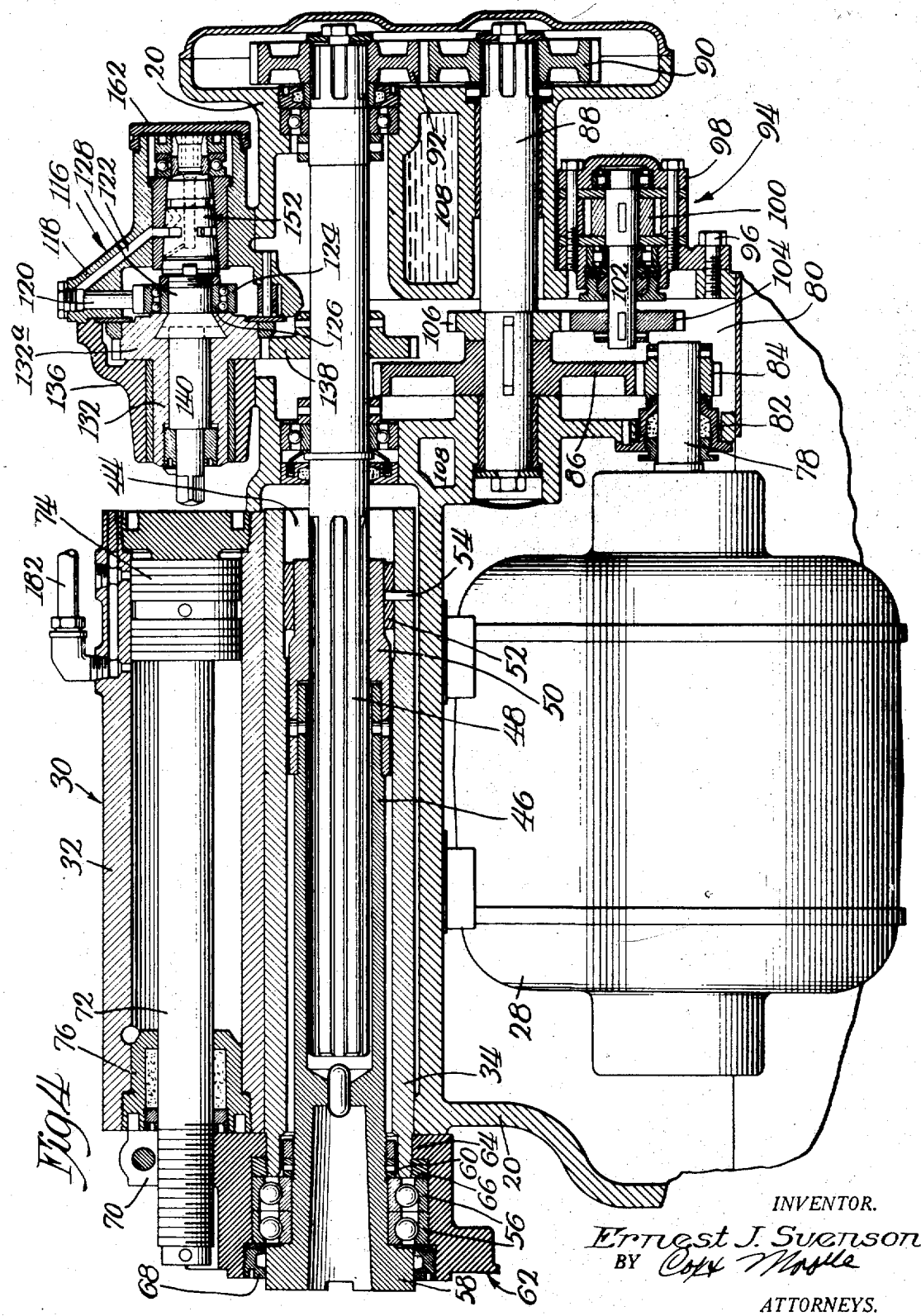

March 31, 1936.  E. J. SVENSON  2,036,162

MACHINE TOOL UNIT

Original Filed Sept. 13, 1930   5 Sheets-Sheet 4

Inventor
Ernest J. Svenson
By Cox & Moore Attys.

March 31, 1936.  E. J. SVENSON  2,036,162
MACHINE TOOL UNIT
Original Filed Sept. 13, 1930   5 Sheets-Sheet 5

Ernest J. Svenson
Cox & Moore
ATTORNEYS.

Patented Mar. 31, 1936

2,036,162

UNITED STATES PATENT OFFICE 2,036,162

MACHINE TOOL UNIT

Ernest J. Svenson, Rockford, Ill., assignor to W. F. & John Barnes Company, Rockford, Ill., a corporation of Illinois Original application September 13, 1930, Serial No. 481,741. Divided and this application November 9, 1933, Serial No. 697,331

28 Claims. (Cl. 77—32)

My invention relates generally to a machine tool unit, and more particularly to a self-contained actuator unit wherein all of the essential elements are mounted upon a unitary head frame. This application is a division of my copending application, Serial No. 481,741, filed September 13, 1930.

In the design of metal removing devices or machine tools wherein a tool support, such as a spindle head is employed, it has been the practice heretofore to mount the hydraulic control for the head independently thereof. In other words, these heads of conventional machines do not serve as a self-contained unitary mounting for all of the propelling elements including the prime mover for rotating the tools or spindles and the source of hydraulic power supply. In the use of these conventional machines, the hydraulic mechanism operates independently of the prime mover for driving the spindles. Hence, should the tools experience overload conditions, the hydraulic mechanism would continue to function, thereby materially increasing the tendency for tool breakage.

It is one of the important objects of the present invention to overcome the above mentioned and other serious disadvantages which have resulted from the use of conventional machine tools of the type mentioned above, and to this end I propose to provide a self-contained actuator unit wherein a frame or head frame structure provides a support for all of the tool and pump driving mechanisms.

More specifically, it is an object of my invention to provide a self-contained actuator unit, as above set forth, wherein driving spindles are driven from a prime mover, which also serves to propel a pumping mechanism, which pumping mechanism delivers fluid to a hydraulic actuator serving to effect relative movement between at least one of said spindles and the base upon which the frame may be mounted.

A further object of my invention is to provide an actuator unit, as set forth above, which may be standardized for application to various mountings, and which may be shifted from place to place without the necessity of tearing down or dismantling the machine tool structures, and it is a further object to so arrange the unit that it will function with equal effectiveness in a horizontal, vertical, or inclined plane, and that it may be attachable or detachable with a minimum amount of skill and effort.

Still another object of my invention is to provide a hydraulically operated self-contained actuator unit which is extremely accurate in effecting the performance of cutting operations, and to this end I provide a spindle support and a hydraulic actuator arranged in parallelism therewith, said parts, together with the prime mover for the spindle and the pump mechanism also driven thereby, being mounted upon a unitary head frame.

In addition to the above mentioned advantageous characteristics, my invention contemplates the provision of an actuator unit, in which a prime mover, a plurality of fluid pumping mechanisms, a fluid actuator, a tool holding mechanism, and a control mechanism therefor are all supported upon a unitary frame structure so as to present a self-contained actuator unit.

Still another object of my invention is to provide a self-contained actuator unit, as set forth above, wherein the constituent parts are so organized as to enable them to be combined into a relatively small compact unit, with the entire "power house" or driving mechanism mounted upon a unitary frame structure.

The foregoing and numerous other objects and advantages will be more apparent from the following detailed description when considered in connection with the accompanying drawings wherein Figure 1 is an elevational view of a drilling machine which is representative of one embodiment of my invention;

Figure 2 is a fragmentary plan view of the control slide and associated parts, said slide being shown in its advanced position as distinguished from the starting position shown in Figure 1; said view taken along line 2—2 of Figure 1;

Figure 3 is a transverse sectional view taken substantially along the line 3—3 of Figure 1;

Figure 4 is a vertical sectional view taken substantially along the line 4—4 of Figure 3;

Figure 5:
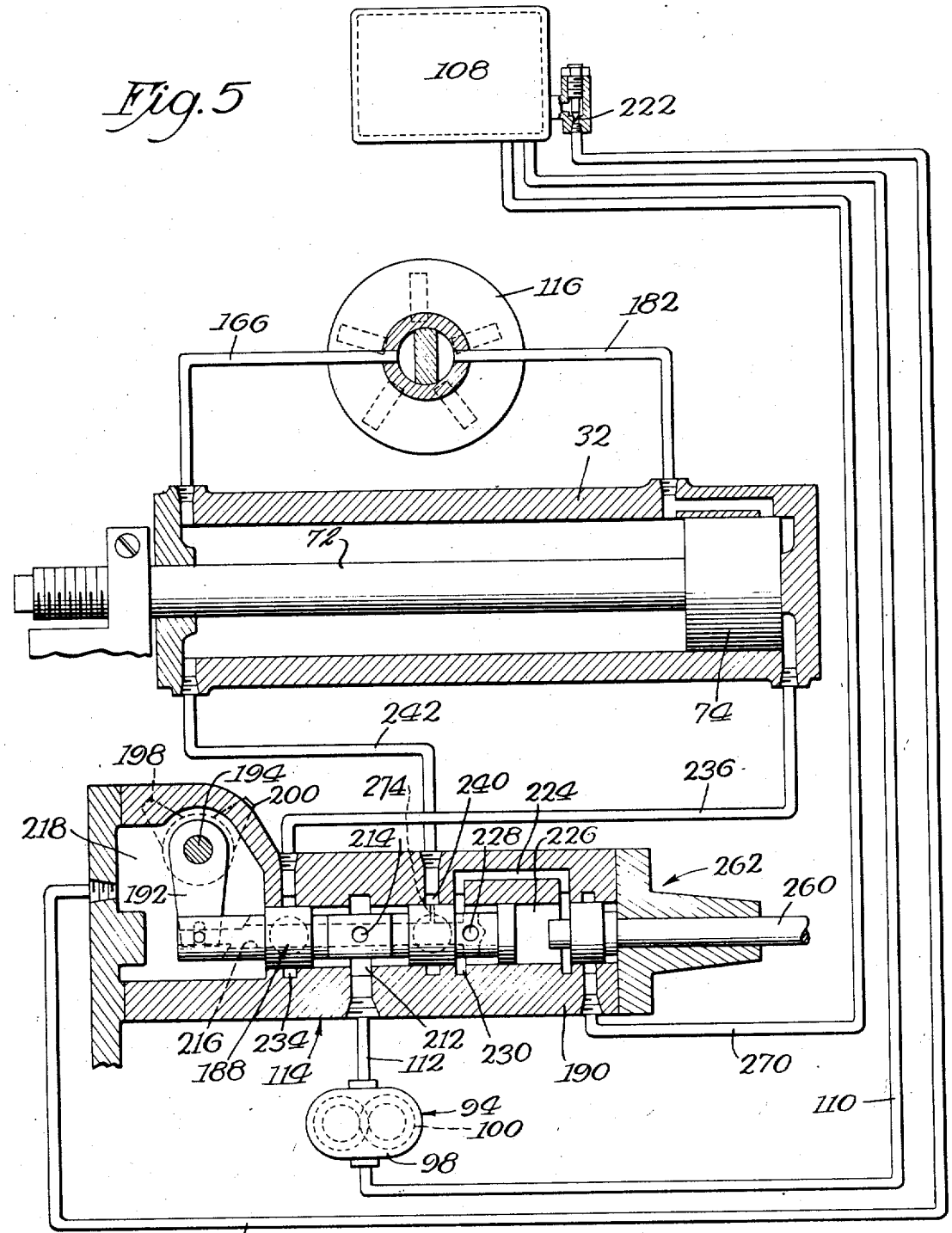
Figure 5 is a semi-diagrammatic layout of the hydraulic circuit to more clearly illustrate the manner in which the conduits are compactly arranged and cooperate with the other elements to present a self-contained actuator unit.

The present invention is directed to the self-contained feature of a machine tool and the combination of those elements which coact to make possible said unitary construction. My invention is not concerned with the specific multi-sided arrangement of the spindle support disclosed herein, except as it may enter into the general combination with other elements to present a self-contained actuator unit, which forms the basis for the invention claimed herein. In the parent application referred to above the specific arrangement of the multi-sided spindle support is claimed apart from the self-contained actuator structure which is claimed herein.

Referring now to the drawings more in detail, wherein I have designated similar parts by like numerals, it will be seen that for the purpose of illustrating one practical application of my invention, I have disclosed said invention in connection with a drilling unit. This drilling unit includes a main head frame 20 which is adapted to be mounted in any suitable manner upon any suitable base, such as the base or main machine frame 22, Figures 1 and 3. The head frame 20 is secured to the base by means of bolts 24, and secured to the underside of the frame 20 by means of bolts 26 is a prime mover or electric motor 28. One end of the frame 20 provides a support for driving and pumping mechanism, later to be described, while the portion of the frame immediately above the motor 28 supports a frame or housing designated generally by the numeral 30.

The upper portion of this frame or housing 30 provides a cylinder section 32, while the lower portion of the housing is designed to receive a multi-sided or square spindle supporting member or quill 34. Attention is directed to the fact that the upper or cylinder section 32 of the housing 30 is separated on one side from the lower section of the housing by a slot 36 which extends throughout the length of said housing. Suitable screws 38, Figure 3, extend into the upper and lower sections of the housing 30, and by tightening these screws, said sections may be sprung toward each other. When these sections of the housing are forced toward each other by the screws 38, bearing surfaces 40 and 42 of said sections are brought to bear against adjacent complementary surfaces of the support member 34, and similar bearing surfaces 40a and 42a engage companion surface portions of said member. By this arrangement I am able to either positively secure the member 34 against reciprocation within the housing 30, or if it is desirable to reciprocate said member, the adjustment of the screws 38 will serve to take up wear along the aforementioned bearing surfaces.

As previously mentioned, the present invention is not concerned with the specific arrangement of the multi-sided support and the split supporting section adjacent thereto, inasmuch as these structures are being claimed in the aforementioned copending application. However, sufficient description of the multi-sided support and its bearing is being given herein in order to obtain a better understanding of the entire machine structure.

Positioned within a central opening 44 of the quill or member 34 is a rotatable work or tool supporting spindle 46, Figures 3 and 4. Rotation is imparted to this spindle 46 by means of a splined drive shaft 48 which operates within a complementary splined sleeve 50. This sleeve 50 fits over and is coupled with the spindle 46, as clearly shown in Figure 4, and the portion of the sleeve extending away from the spindle is rotatable within a bushing 52 which is secured to the member or quill 34 by means of a pin 54. Thus it will be apparent that the bushing 52 provides the bearing for the inner extremity of the spindle 46.

The outer extremity of the spindle is mounted within suitable anti-friction bearings 56. These bearings are of the preloaded type which are adapted to take up end thrust as well as radial load. A flange 58 formed at the outer end of the spindle 46 is positioned adjacent one side of the bearings 56, and a threaded ring 60 mounted upon the spindle is clamped against the opposite side of the bearings 56. A head 62 encircles the bearings 56, and a flange 64 of said head extends over a ring 66 carried by the adjacent end of the quill 34. A threaded clamping ring 68 mounted within the outer portion of the head 62 cooperates to secure the head 62 in position upon the quill and the spindle. The upper portion of the head 62 is formed with a split nut 70, which is mounted on the threaded outer extremity of a piston rod 72, Figure 4.

This piston rod 72 is connected at its extremity to a piston 74 which is reciprocable within the cylinder 32. Thus it may be stated that the cylinder 32 and the parts contained therein provide a hydraulic actuator for shifting the spindle and the quill in which it is mounted. A suitable packing box 76 prevents the leakage of fluid from the cylinder 32. By having the outer extremity of the piston rod 72 threaded, the position of the head 62 with respect thereto may be conveniently adjusted.

Rotation is imparted to the splined drive shaft 48 through the agency of the electric motor 28. The shaft 78 of this motor terminates within a lubricant retaining chamber 80, and fluid within this chamber is secured against leakage along the shaft 78 by means of a suitable packing box 82. The extremity of the shaft 78 carries a pinion or gear 84, which meshes with a larger gear 86 mounted upon a shaft 88. These gears serve as speed reducing gears and a gear 90 carried by the shaft 88 and a second gear 92 meshing therewith and supported by the splined shaft 48, effect the delivery of power from the shaft 88 to the shaft 48. By having the chamber 80 completely sealed against leakage, the entire unit may be positioned at any angle, or, in other words may be shifted between vertical and horizontal positions without disturbing the operative effectiveness thereof.

A low pressure large displacement pumping mechanism 94 is mounted upon the main frame 20 by means of bolts 96. This pump 94 is of the gear pump type (for example, gear pumps shown in my Patents Nos. 1,912,737 and 1,912,738) and includes a suitable casing 98 which houses a pair of meshing gears 100. A drive shaft 102 of the gear pump 94 is connected by means of gears 104 and 106, Figure 4, to the drive shaft 88. Fluid supplied to this gear pump is retained within a reservoir 108, which is enclosed within the main frame 20, Figure 1. Fluid from this reservoir 108 is directed through a pipe 110 to the intake side of the gear pump 94, and fluid discharged from said pump is directed through a pipe 112 to a valve mechanism 114. Fluid at low pressure supplied by the pump 94 is employed to effect rapid traverse of the actuator piston 74, while fluid from a high pressure variable displacement pump 116 is employed to effect feeding movement of the piston 74.

This pump 116, Figure 4, includes a stationary support or casing 118, which supports a plurality of radially disposed reciprocable pistons 120. The outer ends of the chambers in which these pistons are reciprocable communicate with inclined radial passageways 122. Reciprocation is imparted to the pistons 120 through the agency of an eccentrically adjustable driving ring 124, which is mounted on an anti-friction bearing 126. A suitable rotary driving member 128 carries the anti-friction bearing, and this member is rotatable with and slidable laterally with respect to a rotary driving sleeve 132. This driving sleeve is rotatable within an end casing 136, and rotation is imparted to the sleeve by means of a gear 138 which meshes with companion gear teeth provided along the peripheral surface of a flange 132a of said sleeve. Lateral adjustment of the driving member 128 with respect to the sleeve 132 is effected by means of a cylindrical adjusting member 140 to thereby control the displacement of the pump. To adjust the stroke of the pump pistons, it is only necessary to apply a wrench to the outer squared end of the member 140. The specific arrangement of the eccentric drive and other parts of the pump 116 does not form a part of the present invention, and hence a detailed discussion of these structures is not required in the present application. A rotary valve 152 serves to control the flow of fluid toward and away from the pistons 120, and this valve is coupled with the rotary driving member 128. A suitable cover plate 162 extends over the outer end of the stationary support or casing 118 so as to positively prevent the introduction of foreign matter and to seal fluid within the adjacent chamber of the pump casing. Attention is directed to the fact that, by employing a pump of the type disclosed, leakage from the high to the low pressure sides of the pump is precluded, and hence the pump is particularly adaptable for use in closed circuit work of the type wherein fluid from one side of the pump is delivered to one side of the actuator, and fluid from the opposite side of the actuator is returned directly to the pump.

While the fluid circuit per se disclosed herein does not form a part of the present invention, except as it may enter into the self-contained unit feature of the machine tool, said circuit will be described briefly in order that the functioning thereof may be more readily appreciated.

The hydraulic circuit employed for shifting the actuator piston 74 is controlled through the manually or automatically operable valve mechanism 114. This valve mechanism includes a valve member 188 which is longitudinally shiftable within a casing 190. The shifting of the valve member 188 is occasioned in response to the actuation of a depending arm 192, which is pivotally connected at its lower extremity to the left end of the valve and is mounted at its upper extremity on a horizontal shaft 194. The outer forward extremity of this shaft 194 carries an operating handle 196, and the opposite inner extremity of the shaft supports a pair of fingers 200 and 198, which fingers are respectively positioned in the path of movement of shiftable dogs 202 and 204, Figures 1 and 2. These dogs 202 and 204 are adjustably mounted upon a shifter rod 206, which extends between suitable brackets 208 and 210.

When the valve member 188 occupies the neutral position shown in Figure 3, low pressure fluid from the gear pump 94 is directed from the pipe 112 to an annular port 212 within the casing 190. At this instant the annular port 212 communicates with radial ports 214 in the valve member, and these radial ports direct the fluid into a central longitudinal valve passage 216, which communicates at its left extremity with a valve chamber 218. This valve chamber 218 is connected with the reservoir 108 by means of a pipe 220 and a suitable needle valve 222. Thus fluid from the valve chamber 218 is returned through the pipe 220 and the restricted orifice of the needle valve 222 into the reservoir 108, when the valve member 188 occupies its neutral position. In order that the fluid pressures at each extremity of the valve member be in balance, I provide a passage 224 which serves as means for establishing communication with the central valve passage 216 and the end valve chamber 226. The longitudinal valve passage 216 communicates with this passage 224 through the agency of radial ports 228 and an annular valve port 230. It should also be noted that when the valve member occupies this neutral position, it closes a valve port 234, which communicates with a pipe 236 and also closes a valve port 240, which communicates with a second pipe 242. In other words, no fluid for propelling purposes is delivered to either of the pipes 236 and 242 when the control valve 188 occupies its neutral position. When the actuator piston 74 occupies the position shown in Figure 5, fluid from the feed pump 116 is free to circulate through the cylinder 32.

To initiate a cycle of operation, the handle 196 is shifted so as to carry the valve member 188 to the left. In this position fluid from the rapid traverse pump 94 is directed to the right end of the actuator cylinder 32, thereby causing the piston 74 to be moved at a rapid rate. The dog 204 (Figure 1) is so positioned that when the tool on the spindle reaches the work piece (not shown), said dog engages the finger 198, thereby returning the valve member 188 to neutral. The feed pump now functions to propel the actuator piston 74 at a feeding rate. When the end of the feeding stroke is reached, a dog 256 engages a lever arm 258, and this lever arm is connected at its lower extremity to the outer end of a shaft 260. This shaft 260 forms an actuating element of an unbalancing mechanism 262. It is not essential for a clear understanding of the present invention to enter into a detailed description of this mechanism 262. It will suffice to say that when the shaft 260 thereof is shifted to the left, fluid from the valve chamber 226 is free to flow through a conduit 270 back to the reservoir 108. The unrestricted communication thus set up between the chamber 226 and the reservoir 108 causes the normal pressure of the balancing fluid within the chamber 218 to suddenly shift the valve member 118 to the right. In this position fluid from the rapid traverse pump is directed to the left end of the actuator cylinder 32. Thus the actuator piston 74 is moved at a rapid rate in a reverse direction, namely, to the right. As the piston reaches the limit of its reverse stroke, the dog 202 engages the finger 200, thereby returning the valve member 188 to neutral. In order to initiate another cycle of operation, it is only necessary to again shift the control handle 196.

It will also be understood that the above mentioned closed circuit is so arranged that fluid from the advancing side of the actuator 74 is employed to charge the plunger pump 116 and fluid from the discharge side of the pump 116 is directed into the right extremity of the cylinder 32. In order to take care of slight volumetric changes within the high pressure ciruit, such as volumetric differences presented on opposite sides of the piston 74 due to the presence of the piston rod 72 on only one side thereof, and also to take care of any slight leakage in packing glands, etc., I employ a bleed passage or vent 274 in the valve member 188, which vent is adapted to communicate with the conduit 242 and hence with the cylinder chamber at the left side of the piston 74 when the valve member occupies its neutral position as shown in Fig. 5. This vent functions in a manner somewhat similar to a corresponding bleed passage arrangement disclosed in my copending application Serial No. 439,306, filed March 27, 1930. In said copending application a vent or bleed passage similar to the passage 274 enables excess fluid from the advancing side of a cylinder to be released, whereas in the present application the slight volumetric deficiency in the cylinder chamber at the left side of the piston 74, due to the presence of the piston rod 72, is taken care of by low pressure fluid passing through the vent 274 into the left end of the chamber within the cylinder 32. The restricted orifice or needle valve 222 may be adjusted to establish the desired pressure of the fluid directed into the valve mechanism 114 by the pump 94.

From the foregoing description it will be clear that the arrangement of the conduits connecting the actuator cylinder 32 with the pumps 94 and 116 and also with the reservoir 100 is such as to particularly adapt said parts to be mounted on a unitary frame to present the self-contained actuator unit which forms the basis of this invention. These conduits are relatively few in number and form direct connections between the constituent elements. It will also be apparent that the arrangement of conduits just described presents a closed circuit, whereby the fluid body therein is retained as a confined unit, the fluid from the advancing side of the actuator serving to charge the feed pump, thereby effecting translation of the spindle which is directly proportional to the degree of rotation thereof. In other words, the arrangement is such as to produce absolute synchronism between the longitudinal and rotary movement of the spindle. With the foregoing arrangement of the conduits, the effectiveness of the self-contained actuator unit is materially expedited. Obviously the dogs for controlling the valve 188 may be changed or modified to suit the particular cycle of operation required.

Attention is again directed to the fact that my invention enables the provision of a self-contained complete metal removing apparatus, such as a drill or boring unit, which may be positioned in any plane or may be shifted from place to place with the utmost ease. Heretofore metal removing devices have in many instances been employed which comprise a plurality of devices, such as drill mechanism distributed along a bed, but these devices do not comprise individual self-contained complete operating units of the type set forth above and shown in the drawings. In these conventional machines it has been the common practice to employ a central source of hydraulic fluid supply for a plurality of drilling devices as distinguished from my improved "unit" construction wherein the source of hydraulic power supply for reciprocating a support, such as a drill holder, as well as the power supply, such as an electric motor for imparting rotation to said holder, are all contained within a single portable unit. This unit may be shifted from place to place, positioned at any angle and employed in the same sense as a portable hand drill. Obviously the unit may be relatively large when employed for heavy duty work, or, when designed for lighter work, it may be relatively small in size. By having the pumps driven from the same prime mover or electric motor which rotates the spindle, the possibility of breakage is reduced to a minimum. This must be distinguished from conventional machines, for example, the type equipped with one prime mover for propelling the feed pump, and another prime mover for rotating the spindle. In the event that the spindle under such circumstances meets an obstruction, the hydraulic pressure will continue to move the spindle longitudinally, thereby increasing the possibility of tool breakage. My self-contained actuator unit also eliminates breakage which has been experienced heretofore in instances where a plurality of drill heads are propelled longitudinally from a single source of fluid supply. In such arrangements the breakdown of one drilling device will directly affect the functioning of the other drilling devices, because each device is not a self-contained independently operable unit. Another advantageous feature of my invention resides in the fact that my unit may be mounted in any convenient position, and in that position will perform a complete cycle of operation by merely manipulating a control handle in a single direction.

It might also be stated that my improved self-contained compact portable unit supplies the present demand in the machine tool industry for standardized equipment. That is to say, my invention enables the standardization of machining apparatus, and thereby eliminates the necessity of constructing relatively expensive special machines for each type of work to be performed. It will also be apparent that my invention broadly relates to self-contained actuator units wherein the tool is adapted to be longitudinally shifted with respect to a supporting base. While in the present instance I have disclosed the head frame mounted upon the supporting guide surface of a main frame or bed 22 in such a manner that the head frame may be secured in a fixed position with respect to said surface, the invention is by no means limited to such a construction, but contemplates self-contained actuator units of modified form which function to cause relative movement between a tool holder and the supporting surface of a main frame, and eliminate the difficulties experienced heretofore in the use of conventional machines. It will also be apparent that the self-contained feature of my unit is such as to preclude the necessity of connections other than electrical, and in this manner I eliminate the unsightly appearance of external conduits or pipes, and also reduce to a minimum the possibility of fluid leakage.

Figure 6:
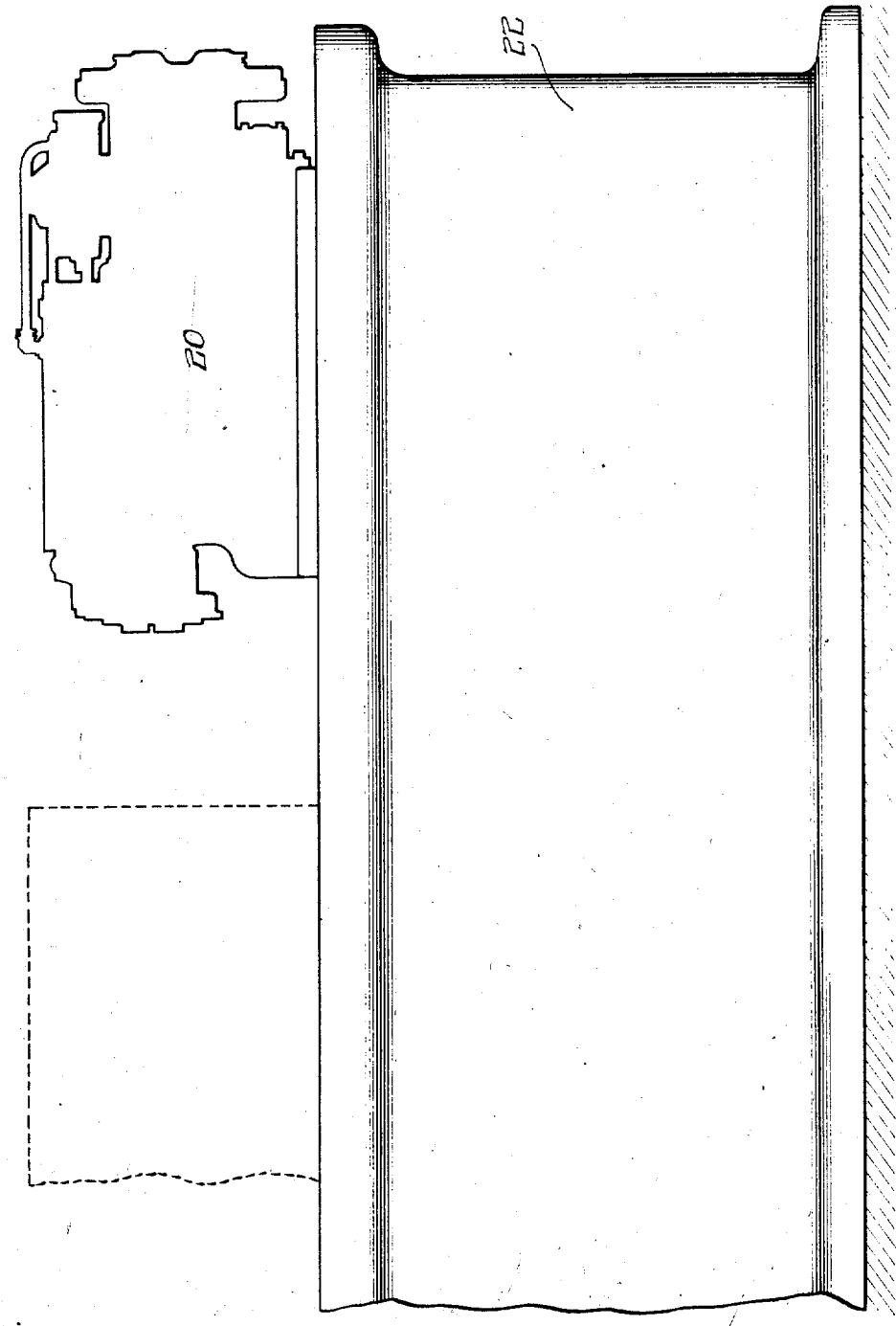
Figure 6 schematically discloses the manner in which the self-contained actuator unit may be supported by a main machine frame.

In Fig. 6 I have schematically illustrated the manner in which the unitary head frame may be mounted upon the main frame or bed 22. A work holder is indicated by dotted lines in a position for supporting the work piece to be acted upon by a tool supported within the spindle 44.

The terms "self-contained actuator unit", "unitary head frame", etc., referred to in the specification and claims, have been used advisedly with a view of clearly distinguishing applicant's invention from conventional machine tools of the type in which, contrary to applicant's, the tool spindles, feed transmission, rapid traverse transmission, prime mover, and control arrangement are not segregated into a detachable, coherent, unitary organization. In other words, these terms refer to a portion or part of a machine which is in a sense separable or detachable from the main frame structure and from the structure which supports the work piece. The self-contained actuator unit or head frame contains the rotating and propelling mechanisms, namely, those actuating parts of the machine which are grouped together in a coherent, compact manner and are adapted to be supported by a main frame structure. Conventional machines incorporate a frame structure which supports the actuating parts and work support in such a manner as to preclude the shifting or detachment of said actuating parts as a unit.

While I have herein disclosed certain specific structural features, it should be understood that the invention is capable of modifications and changes in structural design without departing from the spirit and scope of the appended claims.

Having thus described my invention, what I claim as new and desire to secure by Letters Patent is:

1. A self-contained actuator unit including a rotary spindle, a prime mover for driving said spindle, means associated therewith for effecting variation in rotative speed of said spindle, a plurality of fluid pumping mechanisms, hydraulically responsive means for imparting reciprocation to said spindle, a multi-sided support for said spindle having oppositely disposed bearing surfaces, valve mechanism for controlling the connection of at least one of the pumping mechanisms with said hydraulically responsive means, control mechanism for governing the timed functioning of the valve means in accordance with a preselected cycle of operation, and a head frame having oppositely disposed bearing surfaces cooperatively arranged for receiving and guiding the bearing surfaces of said spindle support, said frame being adapted for carrying all of said elements as a self-contained actuator unit, whereby to render said parts movable as a unit from one position to another.

2. In a hydraulically actuated machine tool, a fluid operated actuator including a piston within a cylinder, a rotary spindle translatable in response to the operation of said actuator, means for supplying fluid under pressure to said actuator, means for driving said fluid supplying means in synchronism with the rotation of the spindle, a duct connecting one side of said actuator with the intake side of said fluid supplying means, and a duct connecting the discharge side of said fluid supplying means with the other end of said actuator, whereby to present a closed hydraulic circuit, said ducts being constructed and arranged to retain a fluid body therein as a confined unit for propelling purposes, the fluid from the advancing side of the actuator serving to charge said fluid supplying means and thereby effecting translation of the spindle which is directly proportional to the degree of rotation thereof.

3. In a hydraulically actuated machine tool structure, a fluid operated actuator, including a piston within a cylinder, a rotatable spindle positioned to one side of and in substantial parallelism with said actuator piston, means for supplying fluid under pressure to said actuator, means for driving said fluid supplying means in synchronism with the rotation of the spindle, a duct connecting one side of said actuator with the intake side of said fluid supplying means, and a duct connecting the discharge side of said fluid supplying means with the other end of said actuator, whereby to present a closed hydraulic circuit, said ducts being constructed and arranged to retain the fluid body therein as a confined unit for propelling purposes, the fluid from the advancing side of the actuator serving to charge said fluid supplying means and thereby effecting translation of the spindle which is directly proportional to the degree of rotation thereof.

4. A self-contained actuator unit comprising a hydraulic actuator member, a rotatable tool supporting spindle connected with said actuator member and longitudinally translatable in response to the shifting of said actuator member, a pumping mechanism for supplying fluid under pressure to said hydraulic actuator member, said pumping mechanism including a housing, a plurality of shiftable pistons in said housing, valve means for said pistons, adjustable driving means for imparting movement to said pistons, a rotary member for imparting rotation to said adjustable driving means, means directly engaging said rotary member and driven from said tool supporting spindle, whereby rotation is imparted directly from said spindle to said rotary member, a prime mover, and a head frame for supporting all of said parts as a self-contained unit.

5. A self-contained actuator unit including a unitary head frame housing having a supporting surface, a spindle rotatably mounted in said head frame, the axis thereof being parallel with said supporting surface, a hydraulically responsive translating element carried by said head frame, mechanism carried by the head frame for moving said element at a feeding rate, a prime mover having a rotary drive shaft, an intermediate shaft driven from said prime mover, speed change gearing coupled with said intermediate shaft and cooperating therewith to provide a driving coupling between the prime mover, the spindle and the mechanism for moving the translating element at a feeding rate, rapid traverse mechanism carried by the head frame and coupled with said prime mover independently of said change speed gearing and control means mounted on said head frame for selectively governing the operative effectiveness of said first mechanism upon said translating element, said head frame and elements supported thereby presenting a self-contained actuator unit.

6. In a machine tool, the combination of a main supporting frame structure, a self-contained machine head frame on said main frame structure, a tool driving and supporting structure on said head frame, rotary tool driving transmission on said head frame, actuator means for effecting relative movement between a supported tool and said main supporting frame structure, hydraulic feeding transmission on said head frame for said actuator means, said feeding transmission being driven through speed change gearing, an electric motor carried by said head frame structure for driving both transmissions, power operated rapid traverse transmission carried by said head frame for causing said actuator means to move said supported tool to a feeding position and for causing the reversal of said actuator means, and control means carried by the head frame and adapted for automatic actuation to selectively govern the operative effectiveness of said feeding and rapid traverse transmissions.

7. In a machine tool, the combination of a main supporting frame structure, a self-contained machine head frame on said main frame structure, a tool driving and supporting structure on said head frame, rotary tool driving transmission on said head frame, actuator means for effecting relative movement between a supported tool and said main supporting frame structure, adjustable feeding transmission on said head frame for said actuator means, said feeding transmission including feed rate adjustment means, an electric motor carried by said head frame structure for driving both transmissions, and power operated rapid traverse transmission carried by said head frame for causing said actuator means to move said supported tool to a feeding position and for causing the reversal of said actuator means.

8. In a machine tool, the combination of a main supporting frame structure, a self-contained machine head frame on said main frame structure, a tool driving and supporting structure on said head frame, rotary tool driving transmission on said head frame, actuator means for effecting relative movement between a supported tool and said main supporting frame structure, feeding transmission on said head frame for said actuator means, an electric motor carried by said head frame structure for driving both transmissions, power operated rapid traverse transmission carried by said head frame for causing said actuator means to move said supported tool to a feeding position and for causing the reversal of said actuator means, said feeding and rapid traverse transmissions being simultaneously and cumulatively effective in propelling said actuator means at a rapid rate during at least a portion of the cycle of operation thereof, and control means carried by the head frame and adapted for automatic actuation to selectively govern the operative effectiveness of said feeding and rapid traverse transmissions.

9. A self-contained actuator unit including a unitary head frame structure adapted to be mounted upon a supporting surface of a machine frame, a spindle rotatably mounted on said head frame, hydraulically responsive means connected with said head frame for imparting translation to said spindle in a direction parallel with the supporting surface of the machine structure to which the head frame is applied, said hydraulically responsive means including a fluid receiving cylinder, a prime mover such as an electric motor on said head frame for rotating said spindle, pumping means on said head frame driven from said prime mover for delivering fluid to said cylinder, and valve means adapted to control the rate and direction of flow of fluid from said pumping means into said cylinder in timed relation with the translation of said spindle, said head frame supporting the aforementioned elements so as to present a self-contained actuator unit.

10. A machine tool including a self-contained actuator unit having a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, pumping means on said head frame driven from said prime mover for delivering fluid to said cylinder, valve means adapted to control the rate and direction of flow of fluid from said pumping means into said cylinder in timed relation with the translation of said spindle, said head frame supporting the aforementioned elements so as to present a self-contained actuator unit, and means for actuating said valve means in timed relation with the translation of said spindle.

11. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, a feed pump on said head frame driven from said prime mover for delivering fluid to said cylinder, a rapid traverse pump on said head frame for delivering fluid to said cylinder, and valve means adapted to control the propelling effectiveness of fluid delivered by said pumps into said cylinder in timed relation with the translation of said spindle, said head frame supporting the aforementioned elements so as to present a self-contained actuator unit.

12. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, a feed pump on said head frame driven from said prime mover for delivering fluid to said cylinder at a feeding rate, speed change gearing between the prime mover and feed pump for effecting a variation in rotative speeds imparted to said spindle and consequently to said feed pump, and valve means adapted to control the rate and direction of flow of fluid from said pumping means into said cylinder in timed relation with the translation of said spindle, said head frame supporting the aforementioned elements so as to present a self-contained actuator unit.

13. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which said frame is applied, said hydraulically responsive means including a fluid receiving cylinder, a prime mover on said head frame for rotating said spindle, pumping means on said head frame driven from said prime mover for delivering fluid to said cylinder, valve means adapted to control the rate and direction of fluid flow from said pumping means to said cylinder, and a fluid reservoir presented by a portion of said head frame structure, said unitary head frame structure supporting the aforementioned elements so as to present a self-contained actuator unit.

14. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which said frame is applied, said hydraulically responsive means including a fluid receiving cylinder, a prime mover on said head frame for rotating said spindle, pumping means on said head frame driven from said prime mover for delivering fluid to said cylinder, valve means adapted to control the rate and direction of fluid flow from said pumping means, and a fluid reservoir presented by a portion of said head frame structure, said reservoir being so positioned as to insure gravity feed of fluid to the pumping means when said head frame is mounted in an inclined position, said unitary head frame structure supporting the aforementioned elements so as to present a self-contained actuator unit.

15. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, pumping means on said head frame driven from said prime mover for delivering fluid to said cylinder, said pumping means being connected with said hydraulically responsive means by ducts adapted to retain a fluid body therein as a confined propelling unit, whereby to effect a predetermined displacement of fluid during each spindle revolution, a fluid reservoir, a second pumping means for delivering fluid to said cylinder at a faster rate than the first-mentioned pumping means, and valve means adapted to control the propelling effectiveness of fluid delivered by said pumping means into said cylinder in timed relation with the translation of said spindle, said head frame supporting the aforementioned elements so as to present a self-contained actuator unit.

16. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, pumping means on said head frame driven from said prime mover for delivering fluid to said cylinder, and valve means positioned externally of said fluid receiving cylinder for controlling the rate and direction of flow of fluid from said pumping means to said hydraulically responsive means in timed relation with the translation of said spindle, said head frame supporting the aforementioned elements so as to present a self-contained actuator unit.

17. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, pumping means on said head frame driven from said prime mover for delivering fluid to said cylinder, the axes of the electric motor, pump, and cylinder being parallel to the line of reciprocation of said spindle, and valve means adapted to control the rate and direction of flow of fluid from said pumping means into said cylinder in timed relation with the translation of said spindle, said head frame supporting the aforementioned elements so as to present a self-contained actuator unit.

18. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, a feed pump on said head frame driven from said prime mover for delivering fluid to said cylinder, a rapid traverse pump on said head frame for delivering fluid to said cylinder, the drive of said rapid traverse pump being independent of the drive to said spindle, and valve means adapted to control the propelling effectiveness of fluid delivered by said pumps into said cylinder in timed relation with the translation of said spindle, said head frame supporting the aforementioned elements so as to present a self-contained actuator unit.

19. A self-contained actuator unit including a unitary head frame structure adapted to be mounted upon a supporting surface of a machine frame, a spindle rotatable on said head frame, hydraulically responsive means spaced laterally of said spindle and connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, a feed pump on said head frame driven from said prime mover for delivering fluid to said cylinder, a rapid traverse pump on said head frame for delivering fluid to said cylinder, the driving connection between the prime mover, feed pump, and spindle being such as to effect a rate of translation of the spindle during the feeding stroke thereof which has a definite predetermined relation to the rotative speed of said spindle, and valve means adapted to control the propelling effectiveness of the fluid delivered by said pumps into said cylinder in timed relation with the translation of said spindle, said head frame supporting the aforementioned elements so as to present a self-contained actuator unit.

20. A self-contained actuator unit including a unitary head frame structure adapted to be mounted upon a supporting surface of a machine frame, a spindle rotatably mounted on said head frame, the axis thereof being parallel with the supporting surface of the machine frame to which the head frame is applied, a shiftable translating element carried by said head frame, mechanism carried by the head frame for moving said translating element at a feeding rate including means whereby the feeding rate of said translating element may be adjusted, a prime mover mounted on said head frame for imparting rotation to said spindle and operatively coupled for driving purposes with said feeding mechanism, power driven mechanism carried by the head frame for moving said translating element at a faster rate, and control means on said head frame adapted to selectively control the operative effectiveness of said mechanisms upon said translating element, said head frame and elements supported thereby presenting a self-contained actuator unit.

21. A self-contained actuator unit including a unitary head frame structure adapted to be mounted upon a supporting surface of a machine frame, a spindle rotatably mounted on said head frame, the axis thereof being parallel with the supporting surface of the machine frame to which the head frame is applied, a shiftable translating element carried by said head frame, mechanism carried by the head frame for moving said translating element at a feeding rate including means whereby the feeding rate of said translating element may be adjusted, a prime mover mounted on said head frame for imparting rotation to said spindle and operatively coupled for driving purposes with said feeding mechanism, power driven mechanism carried by the head frame for moving said translating element at a faster rate, and control means on said head frame adapted to effect the operative functioning of one of said mechanisms independently of the other in shifting said translating element, said head frame and elements supported thereby presenting a self-contained actuator unit.

22. A self-contained actuator unit including a unitary head frame structure adapted to be mounted upon a supporting surface of a machine frame, a spindle rotatably mounted on said head frame, a shiftable translating element carried by said head frame, mechanism carried by the head frame for moving said translating element at a feeding rate including means whereby the feeding rate of said translating element may be adjusted, a prime mover mounted on said head frame for imparting rotation to said spindle and operatively coupled for driving purposes with said mechanism, said driving connection including an intermediate drive shaft, speed change gearing coupled with said intermediate shaft, said gearing being common to both said feeding mechanism and said spindle and providing a driving connection thereto from said intermediate shaft, power operated mechanism carried by the head frame for moving said translating element at a faster rate, and control means on said head frame for selectively governing the operative effectiveness of said feed and rapid traverse mechanisms upon said translating element, said head frame and elements supported thereby presenting a self-contained actuator unit.

23. In a machine tool, the combination of a main supporting frame structure, a self-contained machine head frame on said main frame structure, a tool driving and supporting structure on said head frame, rotary tool driving transmission on said head frame, actuator means for effecting relative movement between a supported tool and said main supporting frame structure, feeding transmission on said head frame for translating said actuator means, an electric motor carried by said head frame structure for driving both transmissions, rapid traverse transmission carried by said head frame and driven from said electric motor for translating said actuator means to move said supported tool to a feeding position and for causing the reversal of said actuator means, means for varying the rate of movement imparted by one of said translating transmissions independently of the other, and control means carried by the head frame and adapted for automatic actuation to selectively govern the operative effectiveness of of said feeding and rapid traverse transmissions.

24. In a machine tool, the combination of a main supporting frame structure, a self-contained machine head frame on said main frame structure, a tool driving and supporting structure on said head frame, rotary tool driving transmission on said head frame, actuator means for effecting relative movement between a supported tool and said main supporting frame structure, hydraulic feeding transmission on said head frame for translating said actuator means, an electric motor carried by said head frame structure for driving both transmissions, power operated rapid traverse transmission carried by said head frame for translating said actuator means to move said supported tool to a feeding position and for causing the reversal of said actuator means, means for varying the rate of movement imparted by one of said translating transmissions independently of the other, and control means carried by the head frame and adapted for automatic actuation to selectively govern the operative effectiveness of said feeding and rapid traverse transmissions.

25. In a machine tool, the combination of a main supporting frame structure, a self-contained machine head frame on said main frame structure, a tool driving and supporting structure on said head frame, rotary tool driving transmission on said head frame, actuator means for effecting relative movement between a supported tool and said main supporting frame structure, feeding transmission on said head frame for translating said actuator means, an electric motor carried by said head frame structure for driving both transmissions, power operated rapid traverse transmission carried by said head frame for translating said actuator means to move said supported tool to a feeding position and for causing the reversal of said actuator means, said rapid traverse transmission being connected intermediate said electric motor and spindle in a manner to render the rapid traverse transmission functionally operable irrespective of the functioning of said feed transmission, whereby said rapid traverse transmission may continue to function regardless of the failure of the spindle to rotate, means for varying the rate of movement imparted by one of said translating transmissions independently of the other, and control means carried by the head frame and adapted for automatic actuation to selectively govern the operative effectiveness of said feeding and rapid traverse transmissions.

26. A self-contained actuator unit including a unitary head frame structure adapted to be mounted upon a supporting surface of a machine frame, a tool driving and supporting structure on said head frame, rotary tool driving transmission on said head frame, hydraulic actuator means for effecting relative movement between a supported tool and said machine frame, hydraulically responsive means including a fluid receiving cylinder adapted to receive a piston, feed pumping means on said head frame for delivering fluid to said cylinder, rapid traverse pumping means on said head frame for delivering fluid to said cylinder, means associated with said hydraulically responsive means to permit circulation of fluid from said feed pump when said piston and cylinder occupy a predetermined relative position, and valve means adapted to control the rate and direction of flow of fluid from said pumping means into said cylinder in timed relation with the translation of said spindle, said head frame supporting the aforementioned elements so as to present a self-contained actuator unit.

27. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, pumping means on said head frame driven from said prime mover for delivering fluid to said cylinder, valve means adapted to control the delivery of fluid from said pumping means to said cylinder in timed relation with the translation of said spindle, and a conduit of restricted cross section adapted to establish communication between said cylinder and said valve means to take care of volumetric variations, said head frame supporting the aforementioned elements so as to present a self-contained actuator unit.

28. A self-contained actuator unit including a unitary frame structure adapted to be mounted upon a supporting surface of a machine frame, a multi-sided reciprocable sleeve on said head frame for supporting a spindle, a rotatable spindle in said sleeve, a prime mover on said head frame for rotating said spindle, a hydraulic actuator including a piston and cylinder construction for imparting reciprocation to said sleeve, a mounting on said head frame for maintaining the alignment of said hydraulic actuator and said sleeve during the longitudinal translation thereof, pumping means on said head frame for delivering fluid to said cylinder, and valve means adapted to control the timed functioning of said hydraulic actuator, said head frame supporting the aforementioned elements so as to present a self-contained actuator unit.

ERNEST J. SVENSON.

DISCLAIMER 2,036,162.—*Ernest J. Svenson*, Rockford, Ill. MACHINE TOOL UNIT. Patent dated March 31, 1936. Disclaimer filed November 23, 1943, by the assignee, *Odin Corporation*.

Hereby enters this disclaimer to claims 4, 7, 9, 10, 13, 14, 16, 17, 20, 23, and 24.

[*Official Gazette December 21, 1943.*]

control the rate and direction of flow of fluid from said pumping means into said cylinder in timed relation with the translation of said spindle, said head frame supporting the aforementioned elements so as to present a self-contained actuator unit.

27. A self-contained actuator unit including a unitary head frame structure adapted to be mounted upon a supporting surface of a machine frame, a spindle rotatable on said head frame, hydraulically responsive means connected with said head frame for imparting translation to said spindle in a direction parallel with the supporting surface of the machine to which the head frame is applied, said hydraulically responsive means including a fluid receiving cylinder, a prime mover such as an electric motor on said head frame for rotating said spindle, pumping means on said head frame driven from said prime mover for delivering fluid to said cylinder, valve means adapted to control the delivery of fluid from said pumping means to said cylinder in timed relation with the translation of said spindle, and a conduit of restricted cross section adapted to establish communication between said cylinder and said valve means to take care of volumetric variations, said head frame supporting the aforementioned elements so as to present a self-contained actuator unit.

28. A self-contained actuator unit including a unitary frame structure adapted to be mounted upon a supporting surface of a machine frame, a multi-sided reciprocable sleeve on said head frame for supporting a spindle, a rotatable spindle in said sleeve, a prime mover on said head frame for rotating said spindle, a hydraulic actuator including a piston and cylinder construction for imparting reciprocation to said sleeve, a mounting on said head frame for maintaining the alignment of said hydraulic actuator and said sleeve during the longitudinal translation thereof, pumping means on said head frame for delivering fluid to said cylinder, and valve means adapted to control the timed functioning of said hydraulic actuator, said head frame supporting the aforementioned elements so as to present a self-contained actuator unit.

ERNEST J. SVENSON.

DISCLAIMER 2,036,162.—*Ernest J. Svenson*, Rockford, Ill. MACHINE TOOL UNIT. Patent dated March 31, 1936. Disclaimer filed November 23, 1943, by the assignee, *Odin Corporation*.

Hereby enters this disclaimer to claims 4, 7, 9, 10, 13, 14, 16, 17, 20, 23, and 24.

[*Official Gazette December 21, 1943.*]

DISCLAIMER 2,036,162.—*Ernest J. Svenson*, Rockford, Ill. MACHINE TOOL UNIT. Patent dated March 31, 1936. Disclaimer filed November 23, 1943, by the assignee, *Odin Corporation*.

Hereby enters this disclaimer to claims 4, 7, 9, 10, 13, 14, 16, 17, 20, 23, and 24.

[*Official Gazette December 21, 1943.*]